(12) United States Patent
Miller et al.

(10) Patent No.: US 8,716,397 B2
(45) Date of Patent: May 6, 2014

(54) BIO-BASED ROOFING ADHESIVE COMPOSITIONS

(75) Inventors: John William Miller, Hudson, MI (US); Nicholas John Berard, Novi, MI (US)

(73) Assignee: ADCO Products, Inc., Michigan Center, MI (US)

(*) Notice: Subject to any disclaimer, the term of this patent is extended or adjusted under 35 U.S.C. 154(b) by 147 days.

(21) Appl. No.: 13/211,874

(22) Filed: Aug. 17, 2011

(65) Prior Publication Data

US 2011/0301292 A1 Dec. 8, 2011

Related U.S. Application Data

(63) Continuation-in-part of application No. PCT/US2011/023311, filed on Feb. 1, 2011.

(60) Provisional application No. 61/300,600, filed on Feb. 2, 2010.

(51) Int. Cl.
| | |
|---|---|
| *C08G 18/00* | (2006.01) |
| *C08G 18/08* | (2006.01) |
| *C08G 18/28* | (2006.01) |
| *C08L 75/00* | (2006.01) |
| *C08L 91/00* | (2006.01) |
| *C09F 1/00* | (2006.01) |

(52) U.S. Cl.
USPC .......... 524/590; 524/589; 527/600; 528/44; 528/74.5; 528/85

(58) Field of Classification Search
USPC ............... 524/589, 590; 528/44, 74.5, 85; 527/600
See application file for complete search history.

(56) References Cited

U.S. PATENT DOCUMENTS

| | | | |
|---|---|---|---|
| 4,546,120 A * | 10/1985 | Peerman et al. | 521/159 |
| 2003/0090016 A1* | 5/2003 | Petrovic et al. | 264/31 |
| 2004/0234487 A1 | 11/2004 | Bremser et al. | |
| 2007/0129451 A1 | 6/2007 | Niemann | |
| 2009/0017311 A1 | 1/2009 | Kislig | |
| 2009/0124719 A1 | 5/2009 | Creazzo et al. | |

OTHER PUBLICATIONS

John Wiley & Sons, Inc., Hawley's Condensed Chemical Dictionary, 14th Edition, online version from http://www.knovel.com, copyright 2002, no page numbers given.*

* cited by examiner

*Primary Examiner* — Patrick Niland
(74) *Attorney, Agent, or Firm* — Vivacqua Law, PLLC; Raymond J. Vivacqua

(57) ABSTRACT

An adhesive composition for use in adhering insulation panels to roofing substrates and roofing membranes to the insulation panels include two components that are mixed prior to application on the roofing substrate. The first component may include a renewable polyol and catalyst. The renewable polyol is selected from any non-petroleum based polyol that is derived from a renewable source. The second component includes isocyanate, and may also include a polyol and a catalyst. The isocyanate and the polyol may each be any non-petroleum based isocyanate or polyol that is derived from a renewable source.

24 Claims, No Drawings

BIO-BASED ROOFING ADHESIVE COMPOSITIONS

CROSS-REFERENCE TO RELATED APPLICATIONS

The present application is a continuation-in-part of International Application No. PCT/US11/23311, filed on Feb. 1, 2011 which claims priority to U.S. Provisional Application No. 61/300,600, filed on Feb. 2, 2010. The disclosure of the above application is incorporated herein by reference.

FIELD

The present invention relates to two-part non-foamable adhesives for use with roofing substrates, insulation boards, and roofing membranes, and more particularly to two-part non-foamable adhesives that have high renewable carbon content.

BACKGROUND

In many roofing applications, for example in large, flat commercial roof decks, the roofing substrate is a concrete, light weight concrete, wood, gypsum, wood fiber or steel roof deck. The roofing membrane is used to seal and protect the roof deck from environmental weather conditions and is placed over insulation boards, which provide insulative qualities. The insulation boards are typically secured to the roofing substrate or roof deck via an adhesive composition. A conventional adhesive composition used to adhere the insulation boards to the roof deck includes polyurethane. The polyurethane adhesives are oftentimes applied directly onto the roof deck, and the insulation boards are then laid onto the roof deck surface. Conventional polyurethane adhesives oftentimes include two separate parts that are mixed by an applicator just prior to being applied onto the surface of the roof deck. The two parts include an isocyanate blend and a polyol blend. Upon mixing, the isocyanate blend reacts or crosslinks with the polyol blend to form the polyurethane adhesive.

The roofing membrane may be made of various materials, such as polymeric materials including EPDM (ethylene propylene diene M-rubber), Mod Bit (Modified Bitumen), TPO (thermoplastic polyolefin), or polyvinyl chloride (PVC). The roofing membrane may be a composite material that includes EPDM or TPO, an example of which is Carlisle's Fleece-BACK® EPDM and FleeceBACK® TPO. The roofing membrane is adhered overtop insulation boards or panels using an adhesive composition such as mopping asphalt (typically Type III or Type IV) or other conventional adhesive compositions that includes polyurethanes. There is room in the art for adhesive compositions in roofing applications that exhibit favorable properties, such as sufficient adhesive strength, shelf life, cure time, and tack that also have high renewable carbon content and/or renewable or environmentally favorable polyol and isocyanate content.

SUMMARY

The present invention provides adhesive compositions for use in adhering insulation panels to roofing substrates and roofing membranes to the insulation panels. The adhesive compositions include two components that are mixed prior to application on the roofing substrate. The first component can include a renewable polyol and catalyst. The renewable polyol is selected from any non-petroleum based polyol that is derived from a renewable source. The second component includes isocyanate, and may also include a polyol and a catalyst. The isocyanate and the polyol may each be any non-petroleum based isocyanate or polyol that is derived from a renewable source.

In one embodiment, the two-part adhesive for roofing applications includes a first composition comprising a renewable polyol present in an amount from about 15% to about 98% by weight of the first composition and a catalyst, and a second composition comprising a renewable isocyanate or renewable diisocyanate. The first composition is combined with the second composition to form a polyurethane adhesive.

In another embodiment the renewable polyol is a non-petroleum based polyol.

In yet another embodiment the renewable polyol is a soybean oil based polyol.

In yet another embodiment the renewable polyol is one of a Castor oil based polyol and polyols based upon the hydroxylation of a fatty acid based triglyceride.

In yet another embodiment the at least one catalyst is an organometallic catalyst selected to achieve a desired reaction profile between the first composition and the second composition when combined.

In yet another embodiment the renewable isocyanate or the renewable diisocyanate is present in an amount of about 100% by weight of the second composition.

In yet another embodiment the renewable polyol is present in an amount from about 60% to about 98% by weight of the first composition.

In yet another embodiment the first composition further includes a non-renewable polyol present in an amount from about 0.1% to about 15% by weight of the first composition.

In yet another embodiment the first composition further includes at least one tertiary amine.

In yet another embodiment the first composition further includes a filler or a viscosity modifier selected from the group consisting of fumed silica, clays, talc, CaCO3, fly ash, and microspheres.

In yet another embodiment the renewable isocyanate or the renewable diisocyanate is a non-petroleum based isocyanate or the diisocyanate.

In yet another embodiment the second composition further includes a polyol having at least one isocyanate-reactive functionality group.

In yet another embodiment the polyol of the second composition is a renewable polyol.

In yet another embodiment the renewable isocyanate or the renewable diisocyanate is present in an amount from about 40% to about 85% by weight of the second composition and the polyol of the second composition is present in an amount from about 60% to about 15% by weight of the second composition.

In yet another embodiment the second composition further includes a metal based polyurethane catalyst employed to expedite the reaction of the renewable polyol of the first composition with the renewable isocyanate or the renewable diisocyanate.

In yet another embodiment the second composition further includes a plasticizer selected from the group consisting of diisononyl phthalate, dioctyl phthalate, and di 2-ethylhexyl phthalate.

In yet another embodiment the second composition further includes a thixotropic agents.

In yet another embodiment the second composition further includes fumed silica.

In yet another embodiment the second composition further includes an anti-foaming agent or a de-foaming agent.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

A roofing membrane is used to seal and protect the roof deck from environmental weather conditions and is placed over insulation boards. The roofing membrane may be made of various materials, such as polymeric materials including EPDM (ethylene propylene diene M-rubber), TPO (thermoplastic polyolefin), polyvinyl chloride (PVC), or Mod Bit (Modified Bitumens). The roofing membrane may be a composite material that includes EPDM or TPO, such as Carlisle's FleeceBACK®, and other suitable membranes. The roofing membrane is adhered overtop insulation boards or panels using an adhesive composition such as mopping asphalt (typically Type III or Type IV) or other suitable materials such as polyurethanes. There is room in the art for adhesive compositions in roofing applications that have high renewable carbon content and also exhibit favorable properties, such as sufficient adhesive strength, shelf life, cure time, and tack. A two-part adhesive composition according to the principles of the present invention is provided for securing a first component to a roofing substrate. The roofing component or membrane may be made of various materials, such as polymeric materials including EPDM (ethylene propylene diene M-rubber), TPO (thermoplastic polyolefin), polyvinyl chloride (PVC), Mod Bit (Modified Bitumens) or may be a composite material that includes EPDM or TPO, such as FleeceBACK®, and other suitable membranes. However, it should be appreciated that other components and other roofing substrates may employ the two-part adhesive composition without departing from the scope of the present invention.

The two-part adhesive composition is generally formed by combining two separate compositions or blends prior to application on the roofing substrate. The two parts include a "B side" or resin side and an "A side" or prepolymer side. Each of the sides is packaged separately and is mixed by an applicator prior to applying on the roofing substrate.

Due to the finite nature of petrochemical resources, increasing emphasis is now placed on the development of polymers from renewable resources abundantly available in nature. In particular, agricultural processing by products such as soy proteins from oil processing are of increasing significance since these are eco-friendly materials based on easily renewable natural resources. The two-part adhesive composition of the present invention is typically non-foaming, with a medium to high level of renewable carbon content, providing for increased environmentally friendly adhesives solutions. Varying degrees of renewable carbon content may be present in either the "A side" or prepolymer side, the "B side" or resin side, or both the "A side" (prepolymer side) and "B side" resin side, depending on the amount of renewable and recyclable content desired.

The two-part non-foamable adhesive composition of the present invention generally offers characteristics and advantages over a foamable adhesive. These include better moisture vapor transition (MVT) and lesser moisture uptake. Other advantages include generally higher physical properties such as tensile, elongation, tear, and compressive strengths. In general, non-foamable adhesives are used for membrane and other applications such as Weather-Tite® Lockin' Pocket Inter-Locking Pitch Pocket System.

The B side blend generally includes a renewable polyol, and at least one catalyst. The renewable polyol is selected from any non-petroleum based polyol that is derived from a renewable source, i.e., is a natural polyol. In a preferred example of the present invention, the renewable polyol is a soybean oil based polyol. Alternatively, the renewable polyol includes Castor oil based polyols and polyols based upon the hydroxylation of a fatty acid based triglyceride. Exemplary renewable polyols suitable with the composition of the present invention are commercially available from Urethane Soy Systems Company under the designation SOYOL including SOYOL R2-052-G and R2-052-C. Other exemplary renewable polyols commercially available from the G. R. O'Shea Company under the designation POLYCIN. Further examples are available under the designation AGROL 2.0 and AGROL 3.0 from BioBased Technologies, LLC and BiOH 210 and 600 from Cargill and Renave di and trifunctional polyols from Dow Chemical Company. Chemical derivatives and combinations of renewable polyols may also be employed in the composition without departing from the scope of the present invention. The renewable polyol comprises from about 5% to about 100% by weight of the B side of the composition. In addition, the B side composition may include a nonrenewable polyol in addition to the renewable polyol. An exemplary nonrenewable polyol that is suitable with the composition of the present invention and commercially available from Bayer MaterialScience is designated as ARCOL PPG 2000. The nonrenewable polyol comprises from about 0% to about 70% by weight of the composition.

The catalysts are selected from any organometallic catalysts in order to achieve the desired reaction profile between the resin and isocyanate components. In some instances, tertiary amines may be used, however, since they also promote the generation of carbon dioxide in the presence of water, precautions must be taken. In a preferred example of the present invention, an exemplary organometallic catalyst used in the B side blend that is suitable with the composition of the present invention and commercially available from G.R. O'Shea Company is designated as VERTELLUS COTIN 227. Another exemplary organometallic catalyst that is suitable with the composition of the present invention and commercially available from Reaxis Inc. is designated as REAXIS C218. While VERTELLUS COTIN 227 is used in this example, other organometallic catalysts and their derivatives could be used in this application. Another example includes an oragnobismuth catalyst that is suitable with the composition of the present invention and commercially available from EW Kaufman and designated as VERTELLUS COSCAT 83. In addition, chemical derivatives and combinations of catalysts may also be employed in the composition without departing from the scope of the present invention.

The B component may also contain fillers and viscosity modifiers such as fumed silica, clays, talc, $CaCO_3$, fly ash, microspheres, and the like. One example suitable with the composition of the present invention includes a molecular sieve under the designation of VORATRON EG711, which is commercially available from Dow Chemical Company. Another example includes a high purity, fumed (pyrogenic) synthetic amorphous silicon dioxide which has been surface-modified with an octylsilane, such as the designated CAB-O-SIL TS-382 which is commercially available from Cabot. Another example includes an antioxidant known under the designation of ETHANOX 330, which is commercially available from Ablemarle.

The A side component includes isocyanate, and may include polyols, catalysts, solvents, plasticizers and thixotropic agents. The isocyanate includes compounds having at least one isocyanate functionality group of NCO. Exemplary isocyanates suitable with the composition of the present invention are commercially available from BASF and under the designation LUPRANATE M10, from Dow Chemical Company under the designation of ISONATE 143L, and from Evonik under the designation VESTANAT IPDI.

Alternatively, the A side isocyanate can also be a renewable isocyanate, such as a biomass sourced difurfuryl diisocyanate, or other renewable diisocyanate. An exemplary renewable diisocyanate is designated as DDI 1410® commercially available from Cognis Corporation. A formula with over 99% renewable content can now be formed by combining the A side, containing the renewable isocyanate with the B side, composed almost entirely of a renewable polyol.

The A side may also include a polyol. The polyol which may be included in the A side may be any compound conventionally used in the production of polyurethanes having at least one isocyanate-reactive functionality. One exemplary polyol suitable with the composition of the present invention includes a polypropylene glycol commercially available from BASF under the designation PLURACOL P2010. Renewable polyols may also be used as an A side component. For example, the renewable polyol can be a 35-70 OH# polyol, such as the designated SOYOL R2-052-G and R2-052-C, commercially available from Urethane Soy Systems. Other exemplary renewable polyols include the designated PRIPLAST 3190, POLYCIN 35, and BiOH Polyol 500, or other exemplary renewable polyols commercially available from the G. R. O'Shea Company under the designation POLYCIN. Further examples are available under the designation AGROL 2.0 and AGROL 3.0 from BioBased Technologies, LLC and BiOH 210 and 600 from Cargill and Renave di and trifunctional polyols from Dow Chemical Company. Chemical derivatives and combinations of polyols may also be employed in the composition without departing from the scope of the present invention. The polyol comprises from about 0% to about 60% by weight of the A side of the composition.

The catalyst employed includes any metal based polyurethane catalyst employed to expedite the reaction of the polyol with the isocyanate. An example of a catalyst includes the designated VERTELLUS COTIN 227 commercially available from G.R. O'Shea Company. Chemical derivatives and combinations of metal based polyurethane catalysts and certain amine based catalysts may also be employed in the composition without departing from the scope of the present invention. The catalyst comprises from about 0% to about 0.5% by weight of the A side of the composition.

The solvent employed is preferable a VOC exempt solvent. An example of a solvent includes the designated JEFFSOL propylene carbonate commercially available from Huntsman. Chemical derivatives and combinations of solvents may also be employed in the composition without departing from the scope of the present invention.

The thixotropic agent employed includes fumed silicas. An example of fumed silica is the designated CABOSIL TS720 commercially available from Cabot Industries. The plasticizer employed includes diisononyl phthalate, dioctyl phthalate, and di 2-ethylhexyl phthalate.

In order that the invention may be more readily understood, reference is made to the following examples which are intended to illustrate various embodiments of the two-part adhesive composition of the present invention, but not limit the scope thereof:

Example 1

| Material | Percent by Weight |
| --- | --- |
| Resin Side | |
| Renewable Polyol | 0%-100%* |
| Nonrenewable Polyol | 0%-100% |
| Organometallic Catalyst | 0%-0.15% |
| Amine Catalyst | 0%-0.15% |
| Fumed Silica | 0%-6% |
| Moisture scavenger | 0%-20% |
| Anti-foam/De-foamer | 0 to 5% |
| Pre-polymer Side | |
| Renewable Isocyanate or Diisocyanate | 0-100%* |
| Nonrenewable Isocyanate | 0-100% |
| Renewable Polyol | 0%-60%* |
| Nonrenewable Polyol | 0%-60% |
| Organometallic Catalyst | 0%-0.15% |
| Plasticizer | 0%-30% |
| Thixotropic agent | 0%-5% |
| Fumed Silica | 0%-3% |
| Anti-foam/De-foamer | 0%-5% |

*At least one of the starred values is typically non-zero.

Example 2

| Material | Percent by Weight |
| --- | --- |
| Resin Side | |
| Renewable Polyol | 0%-100%* |
| Nonrenewable Polyol | 0%-100% |
| Organometallic Catalyst | 0.05% |
| Amine Catalyst | 0.05% |
| Fumed Silica | 1.5% |
| Moisture scavenger | 3% |
| Anti-foam/De-foamer | 1.5% |
| Pre-polymer Side | |
| Renewable Isocyanate or Diisocyanate | 0%-100%* |
| Nonrenewable Isocyanate | 0%-100% |
| Renewable Polyol | 0%-60%* |
| Nonrenewable Polyol | 0%-60% |
| Organometallic Catalyst | 0.05% |
| Plasticizer | 15% |
| Thixotropic agent | 0% |
| Fumed Silica | 1.5% |
| Anti-foam/De-foamer | 1.5% |

*At least one of the starred values is typically non-zero.

Example 3

| Material | Percent by Weight |
| --- | --- |
| Resin Side | |
| VERTELLUS DB OIL | 100 |

-continued

| Material | Percent by Weight |
|---|---|
| (CASTOR OIL) | |
| COTIN 227 | 0.05 |
| Pre-Polymer Side | |
| DDI 1410 | 100 |

Example 4

| Material | Percent by Weight |
|---|---|
| Resin Side | |
| VERTELLUS DB OIL (CASTOR OIL) | 100 |
| COTIN 227 | 0.05 |
| Pre-Polymer Side | |
| Biomass sourced difurfuryl diisocyanate | 100 |

Example 5

| Material | Percent by Weight |
|---|---|
| Resin Side | |
| 35-70 OH# POLYOL | 85 |
| 1,3 PROPANE DIOL | 15 |
| Cotin 227 | 0.05 |
| Pre-Polymer Side | |
| LUPRANATE M-10 | 70 |
| PLURACOL P2010 | 30 |

Example 6

| Material | Percent by Weight |
|---|---|
| Resin Side | |
| 35-70 OH# POLYOL | 85 |
| 1,3 PROPANE DIOL | 15 |
| COTIN 227 | 0.05 |
| Pre-Polymer Side | |
| LUPRANATE M-10 | 70 |
| 35-70 OH# POLYOL | 30 |

Example 7

| Material | Percent by Weight |
|---|---|
| Resin Side | |

-continued

| Material | Percent by Weight |
|---|---|
| 35-70 OH# POLYOL | 85 |
| 1,3 PROPANE DIOL | 15 |
| COTIN 227 | 0.05 |
| Pre-Polymer Side | |
| LUPRANATE MI | 65 |
| 35-70 OH# POLYOL | 35 |

Example 8

| Material | Percent by Weight |
|---|---|
| Resin Side | |
| PLURACOL P2010 | 64.548 |
| DB OIL | 14.896 |
| AP 33 SILANE | 0.695 |
| DIPROPYLENE GLYCOL | 19.861 |
| COTIN 227 | 0.05 |
| Pre-Polymer Side | |
| LUPRANATE MI | 60 |
| PLURACOL P2010 | 40 |

Example 9

| Material | Percent by Weight |
|---|---|
| Resin Side | |
| R2052-G | 60.650 |
| VERTELLUS DB OIL | 30.000 |
| VORATRON EG711 | 2.000 |
| TS 382 | 1.750 |
| 1,3 PROPANE DIOL | 5.000 |
| ETHANOX 330 | 0.500 |
| COSCAT 83 | 0.100 |
| Pre-Polymer Side | |
| LUPRANATE MI | 45.000 |
| AP 33 SILANE | 0.500 |
| PLURACOL P2010 | 48.495 |
| JEFFSOL PC | 6.000 |
| COSCAT 83 | 0.005 |

It should be appreciated that the exemplary trade name materials referenced are for illustration purposes only, and that suitable equivalent manufacturers may be employed. In addition, the A side and B side components may include other additives without departing from the scope of the present invention. As noted above, the A side and B side components are preferably mixed by an applicator prior to being extruded or otherwise applied to the roofing substrate. During mixing, and after mixing, the A side components and B side components react to form a polyurethane adhesive composition having suitable physical properties. In a preferred embodiment, each of the A side and B side contain a dye of two separate colors which, upon mixing, creates a new color indicative of proper blending of the A and B sides. For example, the A side may contain a red dye and the B side may contain a white dye and upon mixing the composition has a pink color. It should be appreciated that other colors may be employed without departing from the scope of the present invention.

The composition exhibits the following tensile strength and elongation tested according to ASTM D412.

Tensile and Elongation Aged 1 Week at Ambient Conditions

|  | Force (lbf) | Maximum Tensile Stress (psi) | % Elongation (%) |
|---|---|---|---|
| Average | 7.26 | 324.17 | 100.74 |
| Standard Deviation | 1.10 | 25.55 | 11.46 |

The two-part adhesive composition exhibits a VOC content of 0 tested according to EPA Method 24 and SCAQMD Method 304-91. In addition, the composition exhibits the following aged peel strength tested according to ASTM D903 for plywood and concrete:

90° Peels aged at different conditions

| Plywood | Break Away Force (lb$_f$/in) | Average Load/Width (lb$_f$/in) | Maximum Load/Width (lb$_f$/in) |
|---|---|---|---|
| Ambient | 5.3 ± 1.2 | 4.5 ± 0.9 | 6.9 ± 1.5 |
| Humidity | 11.6 ± 2.6 | 8.1 ± 1.5 | 12.0 ± 2.1 |
| Heat Aged | 11.4 ± 2.1 | 8.0 ± 1.5 | 12.8 ± 1.9 |

90° Peels aged at different conditions

| Concrete | Break Away Force (lb$_f$/in) | Average Load/Width (lb$_f$/in) | Maximum Load/Width (lb$_f$/in) |
|---|---|---|---|
| Ambient | 3.8 ± 1.8 | 2.2 ± 0.7 | 4.6 ± 1.4 |
| Humidity | 17.2 ± 15.3 | 6.4 ± 0.9 | 13.3 ± 4.1 |
| Heat Aged | 10.5 ± 1.8 | 7.7 ± 0.7 | 11.0 ± 1.6 |

In addition, the composition of the present invention was tested against equivalent products, the results of which are summarized below:

RESULTS

| PROPERTY | TEST METHOD | Present Composition | Non-green equivalent | "Green" Product from Competitor |
|---|---|---|---|---|
| Color | N/A | Yellow Tan | Yellow | Green |
| Green Content | Carbon 14 | 45% | N/A | 12.5% |
| Tensile Strength | ASTM D412* | 323 ± 22 psi | 277 ± 29 psi | — |
| Tensile Strength | ASTM D1623 | — | — | 39.27 psi |
| Peel Adhesion Concrete | ASTM D903 | 9.94 ± 3.64 | 15.42 ± 5.05 | 8.94 ± 3.60 |
| Peel Adhesion plywood | ASTM D903 | 12.79 ± 1.09 | 18.31 ± 6.66 | 16.91 ± 4.13 |
| Flexibility | ASTM D816 | Pass @ 70° F. | Pass @ 70° F. | Fail @ 70° F. |

*Modified

As shown above, the present composition exhibits comparable peel adhesion strength as well as superior tensile strength with a much higher green content. The tensile strength test method was based on ASTM D-412 wherein foam was shot on polyethylene sheet in several isolated beads. Before the foam was tack free, but after it had reached its maximum foam height, in other words, had finished foaming, the bead was compressed with a second polyethylene sheet. The foam was kept compressed for several hours to prevent the bead from curling on the edges. The samples were prepared following ASTM D-412. The testing procedure of ASTM D-412 was followed, except the speed of 10 inches per minute was used in place of the standard 20 inches per minute. The samples were tested after conditioning at room temperature for one week.

The composition may be applied to substrates in environmental temperatures ranging from approximately 40 degrees Fahrenheit to approximately 100 degrees Fahrenheit. The two-part adhesive composition exhibits a set time of 5-30 minutes.

The description of the invention is merely exemplary in nature and variations that do not depart from the gist of the invention are intended to be within the scope of the invention. Such variations are not to be regarded as a departure from the spirit and scope of the invention.

The following is claimed:

1. A two-part adhesive for roofing applications, the two-part adhesive comprising:
    a first composition comprising:
        a renewable polyol present in an amount from about 15% to about 98% by weight of the first composition;
        a non-renewable polyol present in an amount from about 0.1% to about 15% by weight of the first composition; and
        a catalyst, and
    a second composition comprising:
        a renewable isocyanate or renewable diisocyanate,
    wherein the first composition is combined with the second composition to form a polyurethane adhesive.

2. The two-part adhesive of claim 1 wherein the renewable polyol is a non-petroleum based polyol.

3. The two-part adhesive of claim 1 wherein the renewable polyol is a soybean oil based polyol.

4. The two-part adhesive of claim 1 wherein the renewable polyol is one of a Castor oil based polyol and polyols based upon the hydroxylation of a fatty acid based triglyceride.

5. The two-part adhesive of claim 1 wherein the at least one catalyst is an organometallic catalyst selected to achieve a desired reaction profile between the first composition and the second composition when combined.

6. The two-part adhesive of claim 1 wherein the renewable isocyanate or the renewable diisocyanate is present in an amount of about 100% by weight of the second composition.

7. The two-part adhesive of claim 1 wherein the renewable polyol is present in an amount from about 60% to about 98% by weight of the first composition.

8. The two-part adhesive of claim 1 wherein the first composition further includes at least one tertiary amine.

9. The two-part adhesive of claim 1 wherein the first composition further includes a filler or a viscosity modifier selected from the group consisting of fumed silica, clays, talc, $CaCO_3$, fly ash, and microspheres.

10. The two-part adhesive of claim 1 wherein the renewable isocyanate or the renewable diisocyanate is a non-petroleum based isocyanate or the diisocyanate.

11. The two-part adhesive of claim 1 wherein the second composition further includes a polyol having more than one isocyanate-reactive functionality group.

12. The two-part adhesive of claim 11 wherein the polyol of the second composition is a renewable polyol.

13. The two-part adhesive of claim 11 wherein the renewable isocyanate or the renewable diisocyanate is present in an amount from about 40% to about 85% by weight of the second composition and the polyol of the second composition is present in an amount from about 60% to about 15% by weight of the second composition.

14. The two-part adhesive of claim 1 wherein the second composition further includes a metal based polyurethane catalyst employed to expedite the reaction of the renewable polyol of the first composition with the renewable isocyanate or the renewable diisocyanate.

15. The two-part adhesive of claim 1 wherein the second composition further includes a plasticizer selected from the group consisting of diisononyl phthalate, dioctyl phthalate, and di 2-ethylhexyl phthalate.

16. The two-part adhesive of claim 1 wherein the second composition further includes a thixotropic agents.

17. The two-part adhesive of claim 1 wherein the second composition further includes fumed silica.

18. The two-part adhesive of claim 1 wherein the second composition further includes an anti-foaming agent or a de-foaming agent.

19. A two-part adhesive for roofing applications, the two-part adhesive comprising:
   a first composition comprising:
      a renewable polyol present in an amount from about 15% to about 93% by weight of the first composition;
      an organometallic catalyst present in an amount from about 0.01% to about 0.05% by weight of the first composition;
      an amine catalyst present in an amount from about 0.01% to about 0.05% by weight of the first composition;
      fumed silica present in an amount from about 0.01% to about 4.0% by weight of the first composition;
      a dessicant present in an amount from about 0.01% to about 3% by weight of the first composition; and
      an anti-foaming agent present in an amount from about 0.01% to about 1.5% by weight of the first composition, and
   a second composition comprising:
      a renewable isocyanate or renewable diisocyanate,
      wherein the first composition is combined with the second composition to form a polyurethane adhesive.

20. The two-part adhesive of claim 19 wherein the renewable isocyanate or the renewable diisocyanate is present in an amount of about 100% by weight of the second composition.

21. The two-part adhesive of claim 19 wherein the second composition further includes a polyol having more than one isocyanate-reactive functionality group.

22. The two-part adhesive of claim 21 wherein the polyol of the second composition is a renewable polyol.

23. The two-part adhesive of claim 21 wherein the renewable isocyanate or the renewable diisocyanate is present in an amount from about 40% to about 85% by weight of the second composition and the polyol of the second composition is present in an amount from about 60% to about 15% by weight of the second composition.

24. The two-part adhesive of claim 19 wherein the first composition further includes a non-renewable polyol present in an amount from about 0.1% to about 15% by weight of the first composition.

* * * * *